No. 739,222. PATENTED SEPT. 15, 1903.
L. REITER.
FASTENER.
APPLICATION FILED APR. 11, 1903.
NO MODEL.
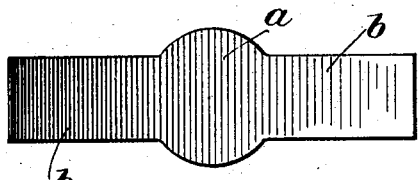
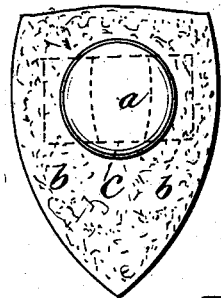
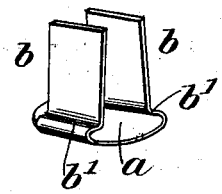
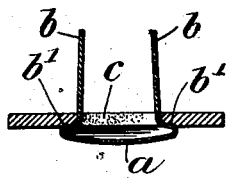
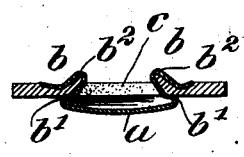
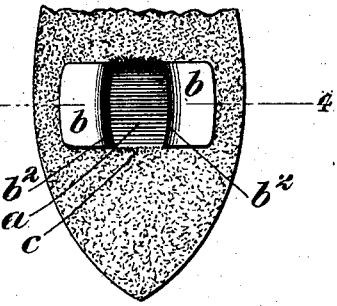
WITNESSES:
William P. Goebel
Isaac B. Owens
INVENTOR
Lues Reiter
BY
ATTORNEYS.

No. 739,222. Patented September 15, 1903.

UNITED STATES PATENT OFFICE.

LUES REITER, OF NEW YORK, N. Y.

FASTENER.

SPECIFICATION forming part of Letters Patent No. 739,222, dated September 15, 1903.

Application filed April 11, 1903. Serial No. 152,163. (No model.)

*To all whom it may concern:*

Be it known that I, LUES REITER, a citizen of the United States, and a resident of the city of New York, borough of Manhattan, in the county and State of New York, have invented a new and Improved Fastener, of which the following is a full, clear, and exact description.

This invention relates to the socket part of those stud-and-socket fasteners used on gloves, suspender-ends, and in various other connections where two flexible sheet-like parts are to be releasably connected.

According to the present example of my invention the socket part is stamped up from an integral section of sheet metal and formed with two opposing overhanging essentially parallel walls, which not only hold the fastener-section securely in the cloth, leather, or other material to which it is applied, but act to engage and hold the stud, the sheet metal forming the socket part having a certain degree of resiliency which allows the stud to be engaged and disengaged at will.

The invention involves various other features of more or less importance, and all will be fully described hereinafter.

This specification is an exact description of one example of my invention, while the claim defines the actual scope thereof.

Reference is to be had to the accompanying drawings, forming a part of this specification, in which similar characters of reference indicate corresponding parts in all the views.

Figure 1 is a plan view of the blank from which the device is formed. Fig. 2 is a perspective view of the fastener part during the first step in its formation. Fig. 3 is a section showing the next step in the formation of the fastener part. Fig. 4 is a section on the line 4 4 of Fig. 6. Fig. 5 is a section showing a stud engaged with the socket part. Fig. 6 is a plan of the inner side of the socket part, showing it applied to a suspender-end; and Fig. 7 is a plan of the outer side of the same.

The blank from which the socket member is formed is shown in Fig. 1, in which view said blank has an essentially circular middle or body portion $a$, from diametrically opposite sides of which tongues $b$ project. This blank is formed of sheet metal stamped up in one integral part.

The first step in forming the socket member is to bend the tongues inward and thence upward, forming shoulders $b'$ on the tongues adjacent to the body $a$. I prefer also to dish the body $a$ slightly, as shown in Figs. 3, 4, and 5. The fabric or other material in which the socket member is to be fastened is formed with an essentially rectangular opening, (indicated at $c$ in Figs. 3, 4, and 6,) and through this opening the tongues $b$ are projected, the shoulders $b'$ lying against the under side of the fabric or other material and the edges of the body $a$ between the tongues lying snugly against the fabric. This position is shown in Fig. 3, and after the same has been taken the tongues $b$ are bent inward and thence outward, as indicated at $b^2$, forming two overhanging diametrically opposite walls, and simultaneously clenching the material to which the fastening-section is applied between the outer portions of the tongues and the shoulders $b'$ thereof.

The engagement of the stud member with the socket member is shown in Fig. 4. In this connection it will be observed that the stud is sprung in between the two overhanging walls formed by the tongues. The material of which the socket part is formed should be possessed of a certain degree of resiliency, so that these overhanging walls will securely hold the stud, but will, however, permit the disengaging of the stud by springing its head out from between the walls.

The invention may be used with a stud or button of any form desired, and the curvature of the walls $b^2$ may be varied at will.

This fastener can be constructed very cheaply and applied securely and easily to the article with which it is to be used. It is more durable and effective than those generally employed heretofore, since a greater and easier movement is allowed to the resilient parts of the socket-piece. This avoids the necessity of forcibly compressing the stud into a practically unyielding continuous circular socket-piece, as heretofore. This advantage is due to the oppositely-situated gripping-walls, which have a widely-separated space between them at each side and which are connected with each other only through the medium of the body-piece.

Various changes in the form, proportions, and minor details of my invention may be resorted to at will without departing from the spirit and scope thereof. Hence I consider myself entitled to all such variations as may lie within the intent of my claim.

Having thus described my invention, I claim as new and desire to secure by Letters Patent—

A socket fastener part, comprising a body and diametrically-situated tongues thereon, said tongues being bent inward at their bases to form shoulders, and the body and said shoulders lying against one side of the material to which the fastener part is applied, the tongues being projected through an opening in such material and having the portions outward from said shoulders bent inward and thence outward to clench the said material between the parts of the tongues at points adjacent to the said opening therein, thereby securing the fastener part in place and forming walls overhanging the body and adapted to engage the stud part of the fastener, the said tongues being separated from each other by edges of the body, and said edges of the body being free and lying flat against the said material at points outward from the opening therein.

In testimony whereof I have signed my name to this specification in the presence of two subscribing witnesses.

LUES REITER.

Witnesses:
  ISAAC B. OWENS,
  JNO. M. RITTER.